United States Patent
Astakhov et al.

(10) Patent No.: US 10,197,679 B2
(45) Date of Patent: Feb. 5, 2019

(54) GNSS BASE STATION ANTENNA SYSTEM WITH REDUCED SENSITIVITY TO REFLECTIONS FROM NEARBY OBJECTS

(71) Applicant: Topcon Positioning Systems, Inc., Livermore, CA (US)

(72) Inventors: Andrey Vitalievich Astakhov, Moscow (RU); Dmitry Vitalievich Tatarnikov, Moscow (RU); Pavel Petrovich Shamatulsky, Moscow (RU); Anton Pavlovich Stepanenko, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 596 days.

(21) Appl. No.: 14/372,499

(22) PCT Filed: Jan. 16, 2014

(86) PCT No.: PCT/RU2014/000020
§ 371 (c)(1),
(2) Date: Jul. 16, 2014

(87) PCT Pub. No.: WO2015/108435
PCT Pub. Date: Jul. 23, 2015

(65) Prior Publication Data
US 2016/0252621 A1 Sep. 1, 2016

(51) Int. Cl.
*G01S 19/22* (2010.01)
*H01Q 1/48* (2006.01)
(Continued)

(52) U.S. Cl.
CPC ............ *G01S 19/22* (2013.01); *H01Q 1/48* (2013.01); *H01Q 1/52* (2013.01); *H01Q 9/0407* (2013.01); *H01Q 9/0428* (2013.01)

(58) Field of Classification Search
CPC ....................................................... G01S 19/22
(Continued)

(56) References Cited

U.S. PATENT DOCUMENTS 5,220,334 A    6/1993   Raguenet et al.
5,694,136 A * 12/1997 Westfall ................. H01Q 1/38
343/700 MS
(Continued)

FOREIGN PATENT DOCUMENTS

DE         3801301       7/1989
RU         2315398       1/2008
(Continued)

OTHER PUBLICATIONS

Klinovski, "Back Radiation Suppression Through a Semitransparent Ground plane for Millimeter-Wave Patch Antenna"; IEEE Transactions on Antennas and Propagation, vol. 65, No. 8. (Year: 2017).*

(Continued)

*Primary Examiner* — Gregory C. Issing
*Assistant Examiner* — Helena H Seraydaryan
(74) *Attorney, Agent, or Firm* — Bardmesser Law Group

(57) ABSTRACT

An antenna system includes an electromagnetic radiator assembled on a ground plane. The ground plane containing a nontransparent area in a center of the ground plane and a semitransparent area surrounding the nontransparent area. The nontransparent area is circular in shape. The semitransparent area is generally circular in shape and contains at least one slot. A plurality of vertical conducting elements are in proximity of a boundary between the nontransparent area and the semitransparent area on a bottom side of the ground plane. The vertical conducting elements are arranged in a circle around a center of the electromagnetic radiator.

19 Claims, 10 Drawing Sheets

(51) Int. Cl.
*H01Q 1/52* (2006.01)
*H01Q 9/04* (2006.01)

(58) Field of Classification Search
USPC .................................................. 342/357.61
See application file for complete search history.

(56) References Cited

U.S. PATENT DOCUMENTS

| | | | | |
|---|---|---|---|---|
| 6,836,247 | B2* | 12/2004 | Soutiaguine | H01Q 9/0414 343/700 MS |
| 7,868,818 | B2* | 1/2011 | Henderson | H01Q 1/28 342/147 |
| 8,749,441 | B2* | 6/2014 | Fenn | H01Q 1/525 343/793 |
| 2004/0246192 | A1* | 12/2004 | Sugawara | H01Q 3/00 343/825 |
| 2011/0115676 | A1* | 5/2011 | Tatarnikov | H01Q 1/48 343/700 MS |
| 2012/0154241 | A1* | 6/2012 | Tatarnikov | H01Q 15/0013 343/848 |
| 2014/0022139 | A1* | 1/2014 | Rao | H01Q 1/48 343/841 |

FOREIGN PATENT DOCUMENTS

| | | |
|---|---|---|
| RU | 2439757 | 1/2010 |
| RU | 2471272 | 6/2011 |
| RU | 119173 | 8/2012 |

OTHER PUBLICATIONS

Elliot. "Multiple-Beam Low-Profile Low-Cost Antenna" (Year: 2013).*
Search Report in PCT/RU2014/000020, dated Feb. 5, 2015.

* cited by examiner

GNSS BASE STATION ANTENNA SYSTEM WITH REDUCED SENSITIVITY TO REFLECTIONS FROM NEARBY OBJECTS

CROSS-REFERENCE TO RELATED APPLICATIONS

This application is a US National Phase of PCT/RU2014/000020, filed on Jan. 16, 2014.

BACKGROUND OF THE INVENTION

Most errors in GNSS signal reception are known to be caused by nearby objects. This is due to the fact that an antenna receives not only the line-of-sight signal broadcast by a satellite but also signals reflected from the nearby objects (the so-called multipath reception). These objects can be divided into two types. The first type of objects are those that are distant from the antenna by several wavelengths (for example, five wavelengths) and even farther. Such effects caused by reflections from these objects may be called "Far-Field Multipath". The underlying surface, primarily, the ground, is the main object of the first type. Objects distant from the antenna by no more than a few wavelengths belong to the second type. The effects caused by them are called "Near-Field Multipath".

Means used for fixing the antenna are primarily related to this group. Antenna fittings are normally under the antenna in its vicinity (at distance of 1-2 wavelengths). A tribrach is often used in satellite geodesic/surveying applications to fix the antenna onto a surveying tripod. Designs of tribrachs are quite diverse. When antenna position over the tribrach changes, it often results in undesirable variation of antenna performance. The antenna phase center is affected by the tribrach. To provide a high quality reception of GNSS signals, the antenna has to suppress multipath signals caused by reflections from far-field objects (first type) and near-field objects (second type). In particular, the antenna phase center should be independent of fitting elements (for example, tribraches) and antenna positions relative to the fixing elements.

Antennas used in satellite positioning tasks are mostly receiving ones. However, in some instances, antenna performance/characteristics need to be considered for a transmission mode. Note that the reciprocity principle governs the identity of antenna characteristics in reception and transmission modes.

If the antenna operates in a transmission mode, rejection of multipath reception means that a field radiated by an antenna has to be low in the lower hemisphere area. However in the upper hemisphere, this field needs to be high. The latter condition is essential for high quality signal reception, including reception from low elevation satellites. FIG. 1 shows a generalized division of antenna space into top and bottom hemispheres with a horizontal dotted line.

A directional diagram is a common characteristic of antenna directivity. But it characterized the field only in the far field area (i.e., area distant from the antenna by a few wavelengths). To eliminate effects of near field objects (tribrach), one needs to minimize the field in the near field area as well. This field has a more complicated pattern. Also, a decrease of the field in the far field zone does not always result in a decreasing field in the near field zone.

Special ground planes are used to reduce the field in the bottom hemisphere. A flat conducting ground plane is of low effectiveness. Impedance choke ring ground planes are more efficient and widespread. Such a ground plane effectively suppress both far field and near field in the bottom hemisphere, but simultaneously reduces the field in the top hemisphere in the horizon direction. It also has considerable dimensions and weight.

SUMMARY OF THE INVENTION

The present invention is related to a GNSS antenna system with reduced sensitivity to reflections from nearby objects that substantially obviates one or several of the disadvantages of the related art.

In one aspect of the invention, an antenna system includes an electromagnetic radiator assembled on a ground plane. The ground plane containing a nontransparent area in a center of the ground plane and a semitransparent area surrounding the nontransparent area. The nontransparent area is circular in shape. The semitransparent area is generally circular in shape. The semitransparent area includes a set of annular slots (at least one) in a metal surface, where the slots (gaps) are a part of the semitransparent area. A plurality of vertical conducting elements are in proximity of a boundary between the nontransparent area and the semitransparent area on a bottom side of the ground plane. In case semitransparent area contains only one annular slot, vertical elements are located in the proximity of inner side of the slot, i.e., in the nontransparent area. The vertical conducting elements are arranged in a circle around a center of the electromagnetic radiator.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The present invention is intended to create an antenna system capable of rejecting undesirable multipath signal caused by reflections from nearby and far objects, with the antenna system still possessing high efficiency factor and low weight and small dimensions.

According to the embodiments described herein, the antenna system is a radiator arranged on a ground plane. The surface of the ground plane contains two areas: nontransparent in the central area and semitransparent area at the periphery, the vertical conducting elements being located in the vicinity of the boundary of these areas on a bottom side of the ground plane.

Nontransparent surface refers to a surface fully reflecting an incident electromagnetic wave. An ideal conducting surface or an impedance surface with imaginary value of the surface impedance are examples of such surfaces. In particular, the impedance value may be close to that of an open circuit (i.e. infinity).

Semitransparent surface refers to a surface partly reflecting an incident electromagnetic wave and partly letting it pass, i.e., reflecting from approx. 10% to approx. 90%. A metal surface with a set of slots is one example. The slots include discrete elements having impedance such as inductances and/or resistors.

Figure 1:
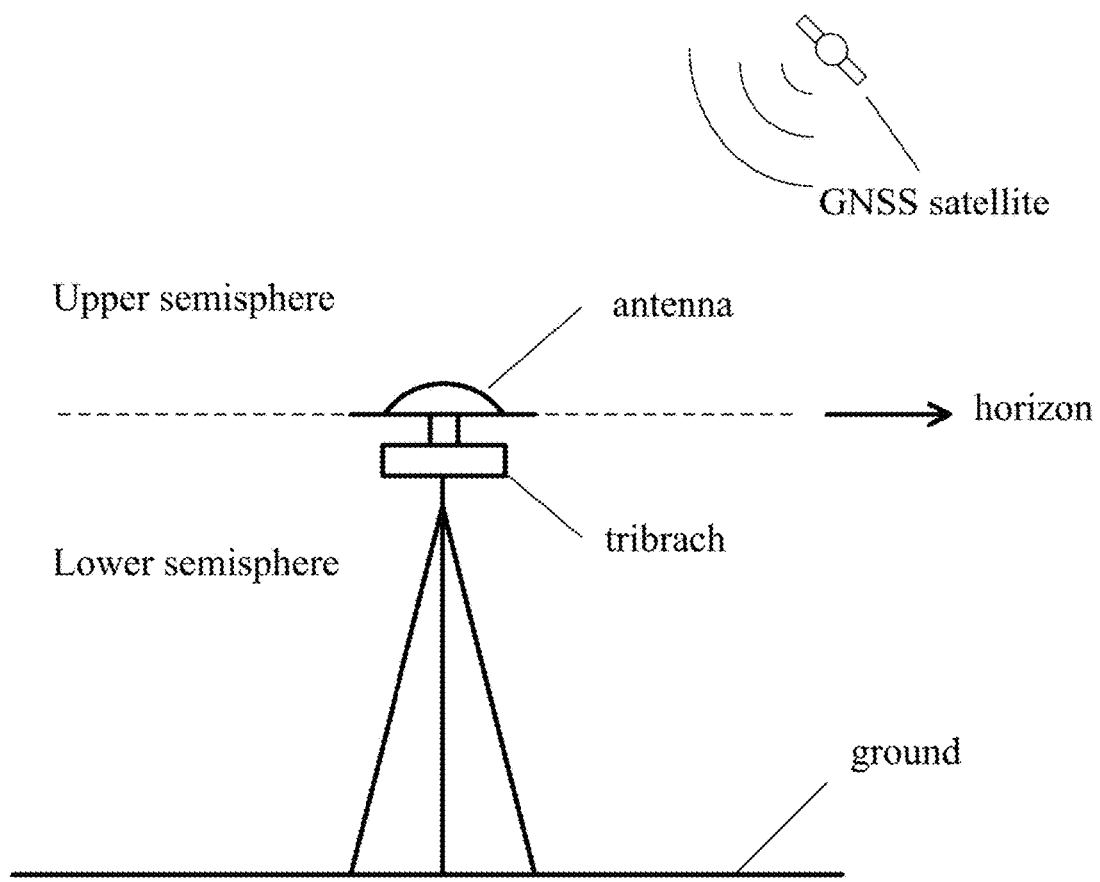
FIG. 1 shows a generalized division of antenna space into top and bottom hemispheres.
Figure 2A:
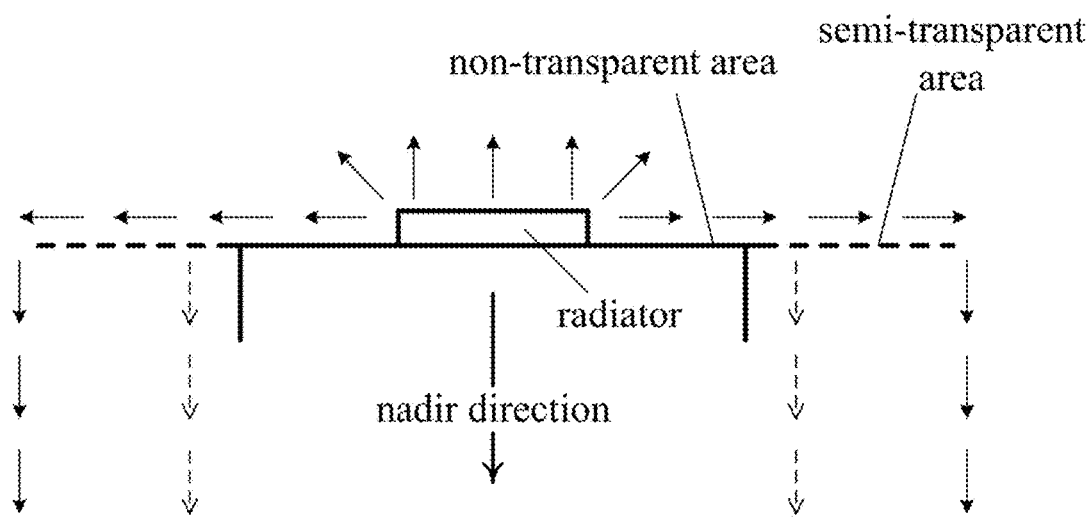
FIGS. 2A and 2B show a nontransparent area of the ground plane with a horizontal line, and a dashed line indicates a semitransparent area.
Figure 2B:
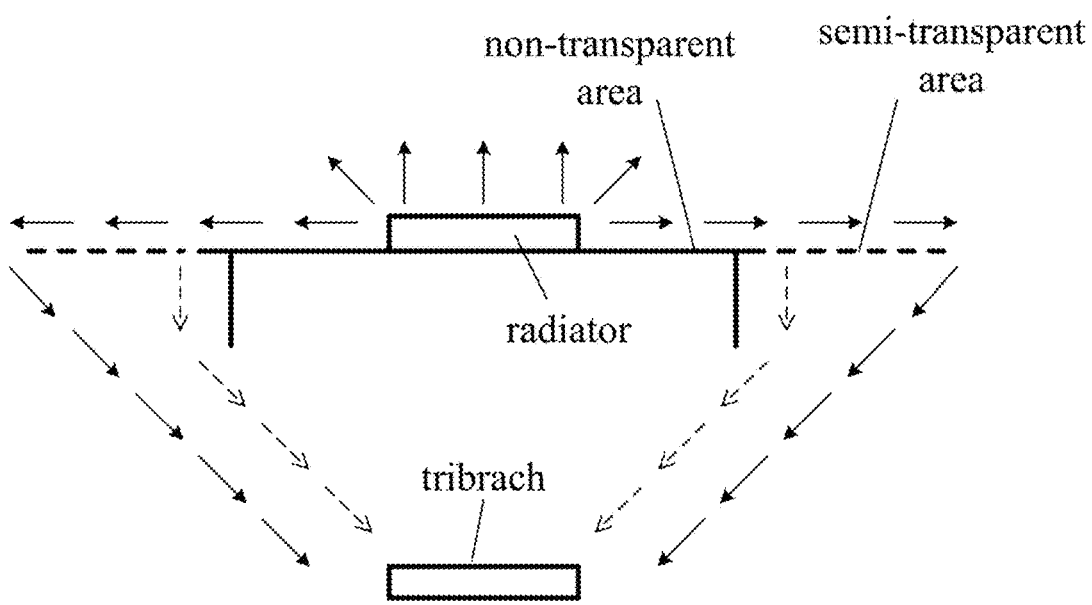
Figure 3:
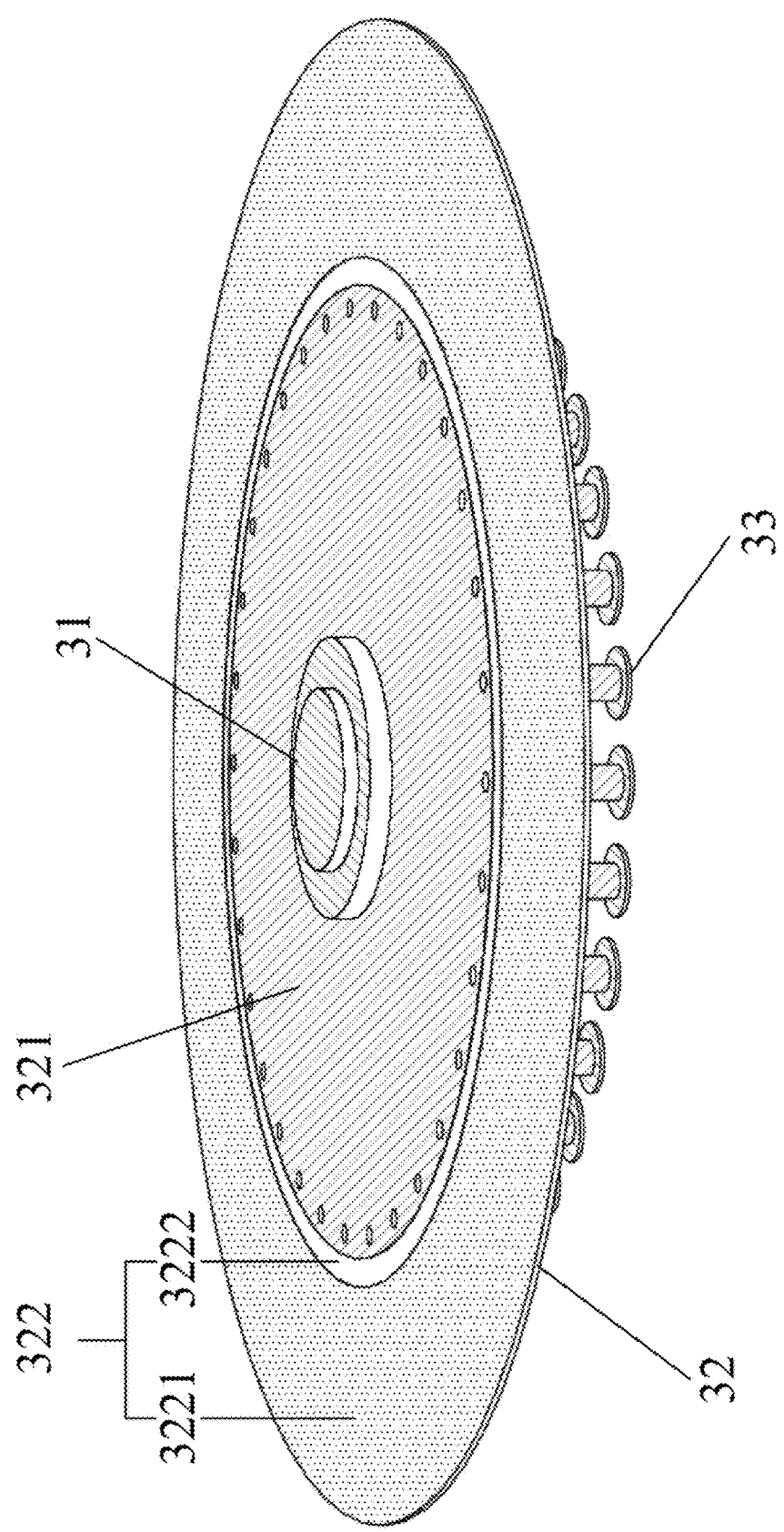
FIG. 3 shows an isometric view of one of the antenna design embodiments.

FIGS. 2A and 2B show a nontransparent area of the ground plane with a horizontal line, and a dashed line indicates a semitransparent area. Vertical elements are shown by vertical lines. A field in the bottom hemisphere can be represented in the form of two components: one bending the ground plane (shown in solid arrows) and the other passing through the semitransparent part of the ground plane (shown in dashed arrows). To suppress the field in the bottom hemisphere, parameters of the semitransparent part of the ground plane are selected such that amplitudes of these components will be the same, and the phase difference will be equal 180°. In this case the components are subtracted and hence the total field is reduced. Such a subtraction operation is most effective in the far zone in the nadir direction. To implement similar efficient subtraction in the near zone (close to the tribrach), the antenna design includes additional vertical elements. These elements enable wave paths to be aligned both in the nadir direction (FIG. 2A), and in the tribrach direction (FIG. 2B), thanks to which fields in both directions are efficiently suppressed. Currents in the vertical elements do not practically radiate in the nadir direction and hence they do not increase the field in this direction.

Figure 9:
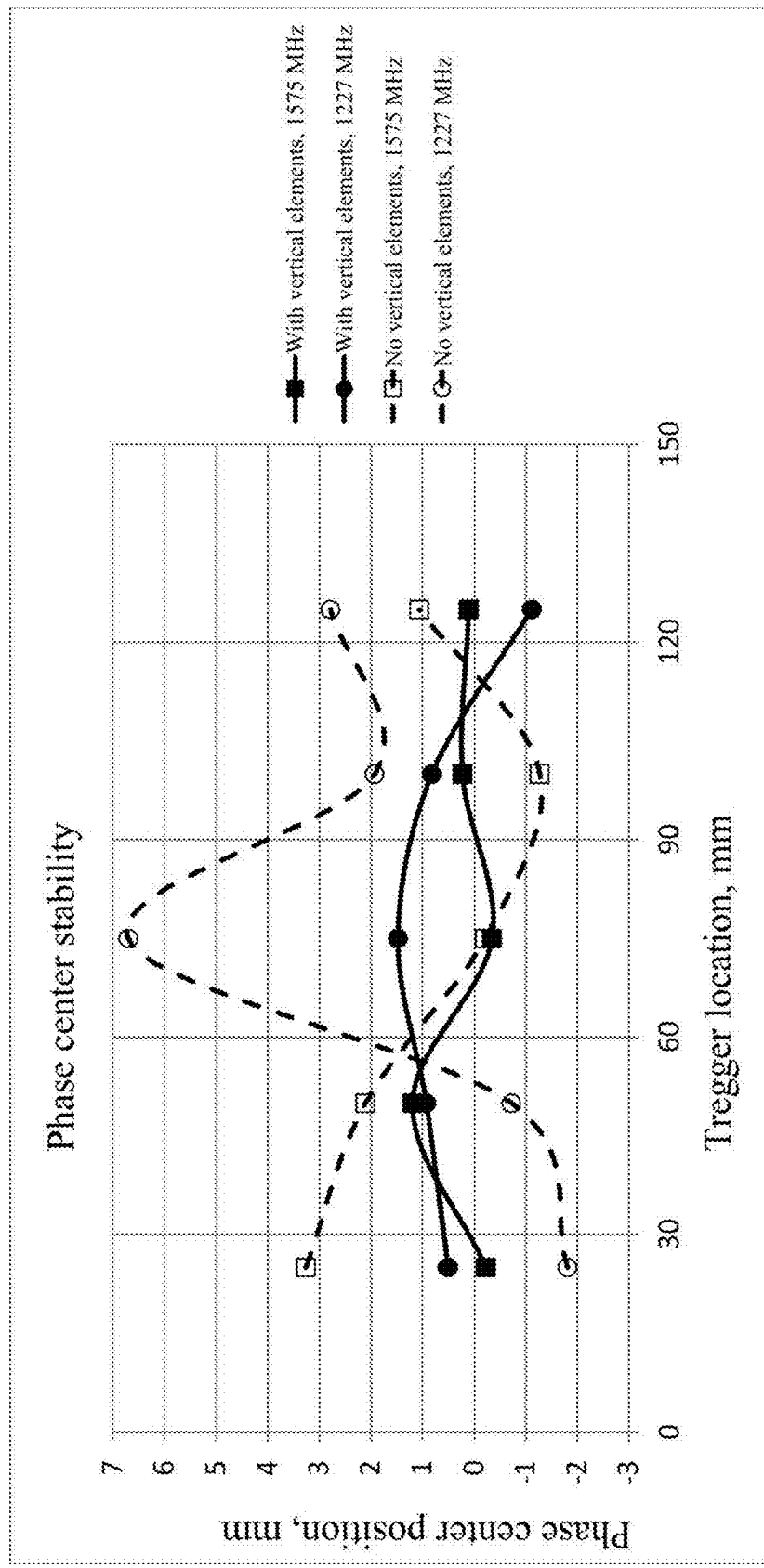
FIG. 9 shows experimental plots of dependences of phase center stability on a change in the distance from an antenna to a tribrach when vertical conducting elements are available/unavailable.

FIG. 9 shows experimental plots of dependences of phase center stability on a change in the distance from an antenna to a tribrach when vertical conducting elements are available/unavailable. Stability means that a distortion of the phase center from its value when the tribrach is close to zero (in the graph, the value of the phase center without a tribrach is 0 of the vertical axis). It is seen that a lack of the vertical conducting elements gives a distortion of the phase center of 7 mm, while a presence of the vertical conducting elements provides a distortion not exceeding 1.5 mm.

According to one embodiment of the invention the proposed antenna system includes a radiator 31 located on a ground plane 32. The surface of the ground plane 32 contains two areas: a nontransparent area 321 in the center, and a semitransparent area 322 located at the periphery. In the vicinity of the two areas from the side of the nontransparent area, from below, there are vertical conducting elements 33. The nontransparent area 321 can present an impedance surface with reactive surface impedance.

FIG. 4 shows one of the antenna design embodiments. A diameter 411 of the nontransparent area is about one wavelength ($\lambda$) and is chosen based on the condition of minimal effects of a local field generated under the ground plane in the area of a slot on objects located directly under the antenna, for example, on a tribrach. A width 423 of the semitransparent area is greater or equal to $0.1\lambda$. The selection of width 423 is governed by, on one hand, by providing the desirable frequency range (the wider this semitransparent area, the wider operating frequency range), and on the other hand, ensuring the desirable rejection of the field in the bottom hemisphere (the narrower the semitransparent area, the better suppression in the near field of the bottom hemisphere).

Figure 4A:
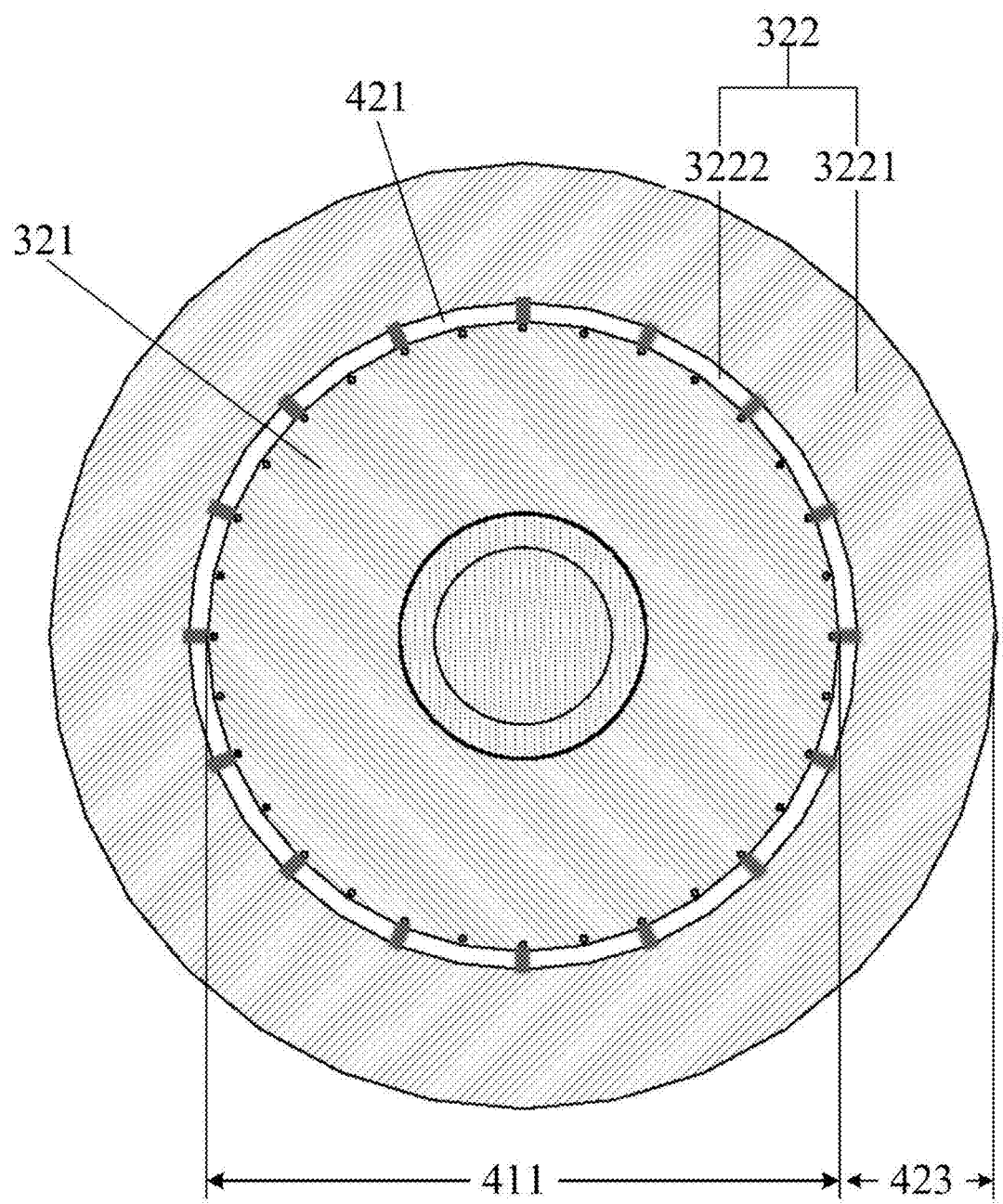
FIG. 4 shows one of the antenna design embodiments.
Figure 4B:
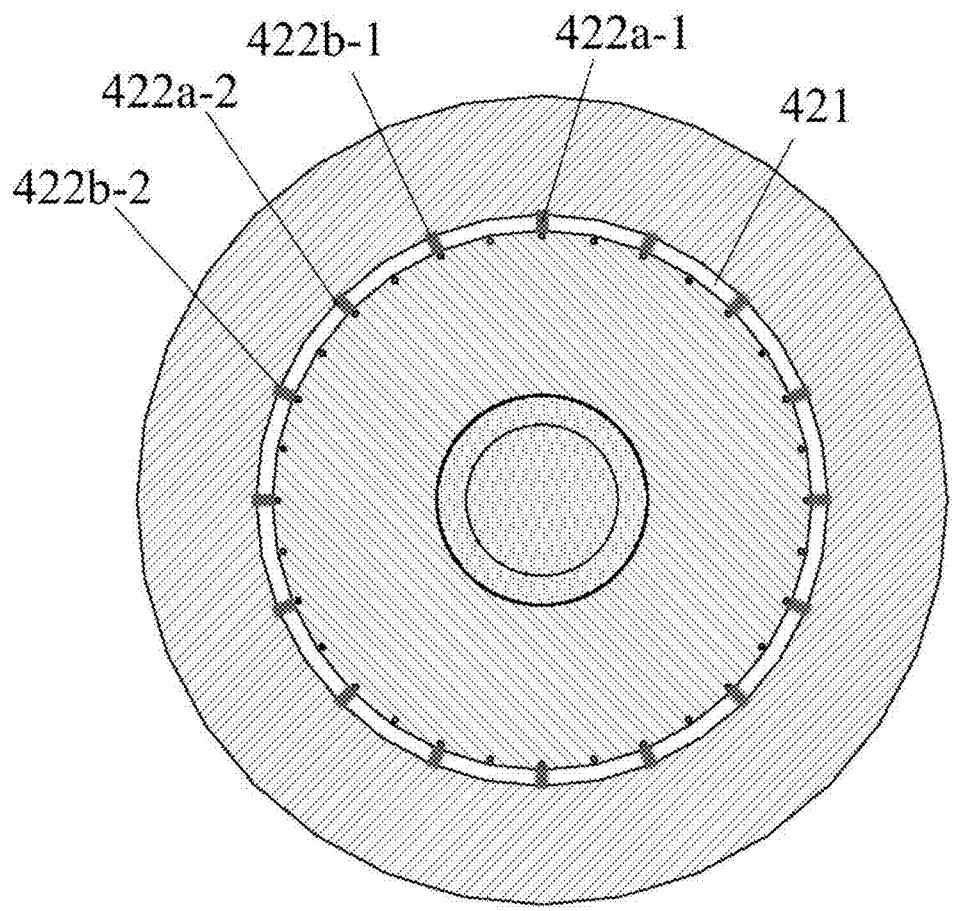
Figure 4C:
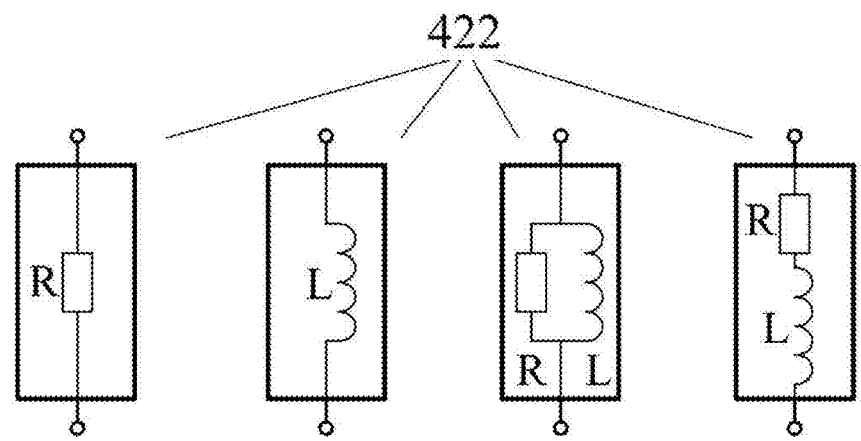

The semitransparent area contains at least one annular slot 421 located close to the boundary of nontransparent (321) and semitransparent (322) areas. If there is a set of annular slots, the slot with minimal diameter is at the boundary of the areas. Elements 422 containing resistors and inductors can be included in the slots, as shown in FIGS. 4A-4C, which show that 422 can include a resistor, an inductor, or their combination (serial or parallel). They also can alternate along perimeter of a slot (a typical embodiment can include alternated resistors and inductors as shown in FIG. 4B) Both discrete and distributed elements can be used as resistors and inductances. Nominal values of the elements are selected from the condition of providing a desired suppression of the field in the bottom hemisphere within the required frequency band. The slot width is determined by ease of installing the elements including resistors and inductances. For instance, for discrete elements the slot width is determined by sizes of the corresponding components.

Conducting pins, for example, cylindrically shaped or mushroom shaped, can serve as vertical elements. One end of the vertical elements is connected either directly to the nontransparent area of the ground plane (galvanic-coupled) or through an inductance. The inductance can be discrete or distributed.

Figure 5:
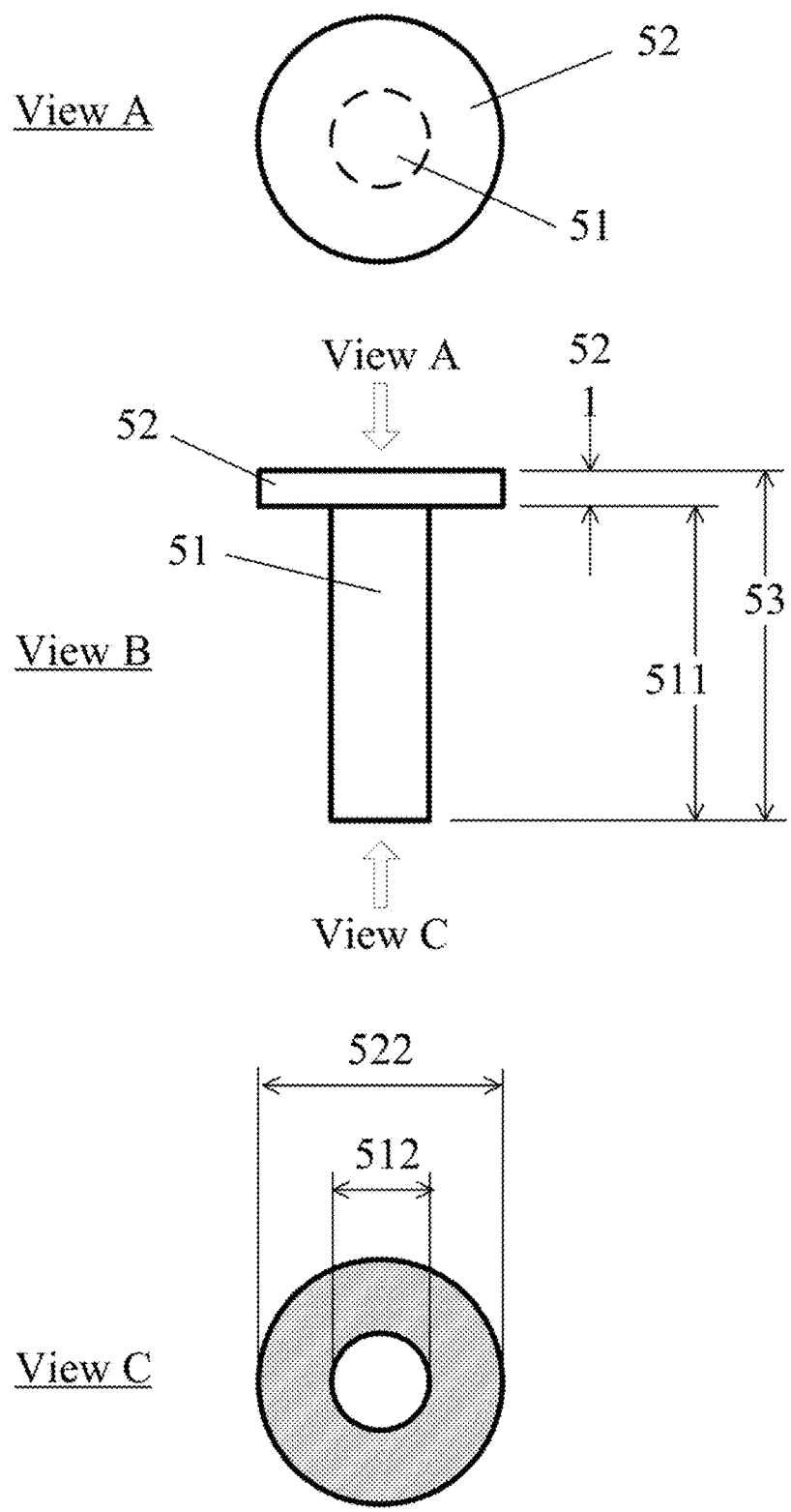
FIG. 5 shows a mushroom shaped element with a conducting pin.

FIG. 5 shows a mushroom shaped element which includes a conducting pin 51 with an expanded tip 52 being connected to the pin. The configuration of the elements is such that a diameter 522 of the tip is greater than the diameter 512 of the pin, and a height 521 of the tip is smaller than a height 511 of the pin. Mushroom shaped elements allow a decrease in total height 53 of the vertical elements compared with a height using pins. Vertical elements can include inductances. Both discrete and distributed elements can serve as inductances. Dimensions of the vertical elements depend on providing a desirable rejection level of the far field in the lower hemisphere.

Figure 6A:
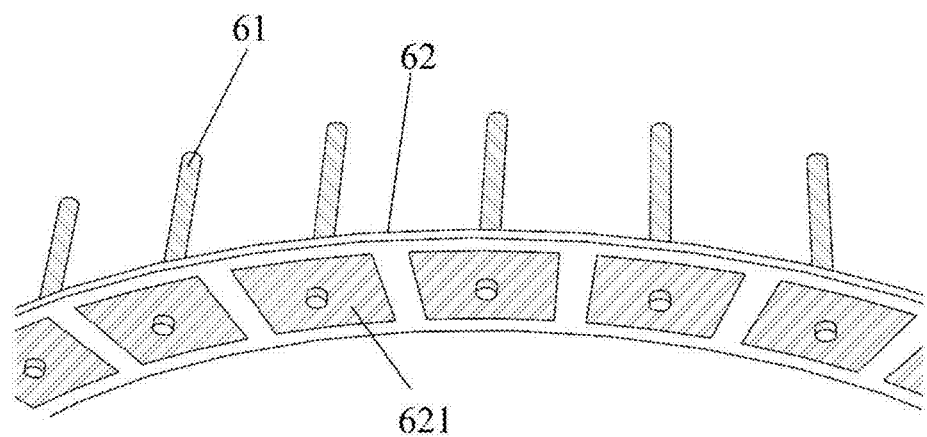
FIG. 6A shows that expanded tips of conducting pins can be metallized areas of a PCB that is located under the ground plane.
Figure 6B:
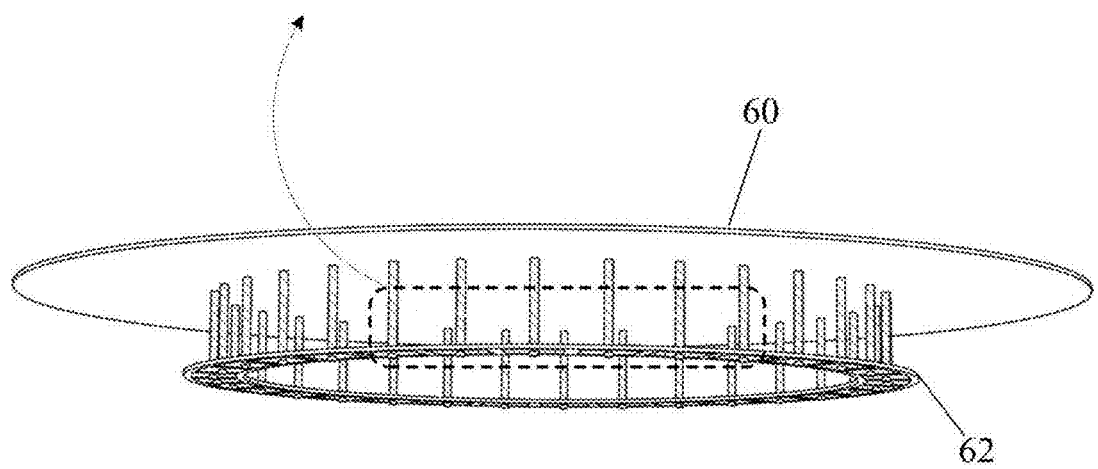
FIG. 6B shows location (disposition) of PCB with expanded tips under the ground plane.

FIG. 6A shows that expanded tips 621 of conducting pins 61 can be metallized areas of PCB 62 that is located under the ground plane 60. FIG. 6A shows a segment of the PCB. The PCB serves as a mechanical support for expanded tips 621. Also, the PCB can be divided into several (e.g., 4) sectors, thus, in effect, several PCBs can be used, in order to simplify manufacturing. The conducting pins are electrically connected with the tips, for example, by soldering. Conducting pins 61 can be standard screws. In this case they also serves as additional fixing for PCB 62. As one embodiment, a bolt is inserted into corresponding hole in the ground plane from the top side, and goes into, for example, a plastic standoff, and then into a corresponding hole in the PCB 62, and a nut at the end of the bolt is used to tighten it. The nut is galvanically connected to an expanded tip 621.

Figure 7A:
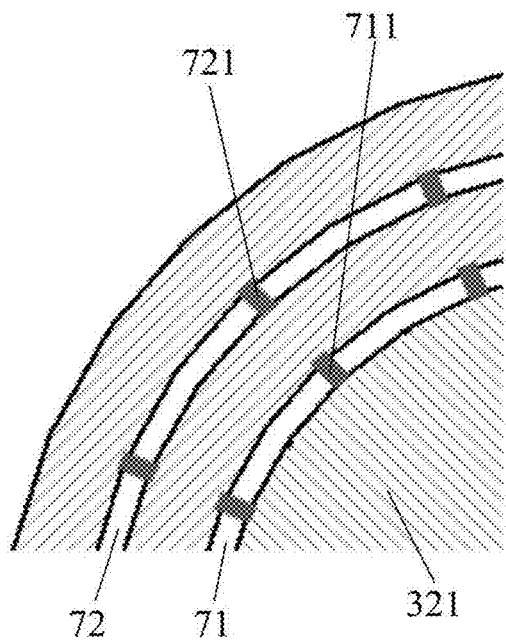
FIG. 7A shows a segment of antenna ground plane for an embodiment where the semitransparent area of the ground plane has two annular slots.

FIG. 7A shows a segment of antenna ground plane for an embodiment where the semitransparent area of the ground plane has two annular slots 71 and 72. The annular slot 72 of the larger diameter provides for additional rejection of the near field in the area of the first slot 71. The second slot (and all following slots, if any) allows to have one more degree of freedom to adjust the rejection of near and far field.

Figure 7B:
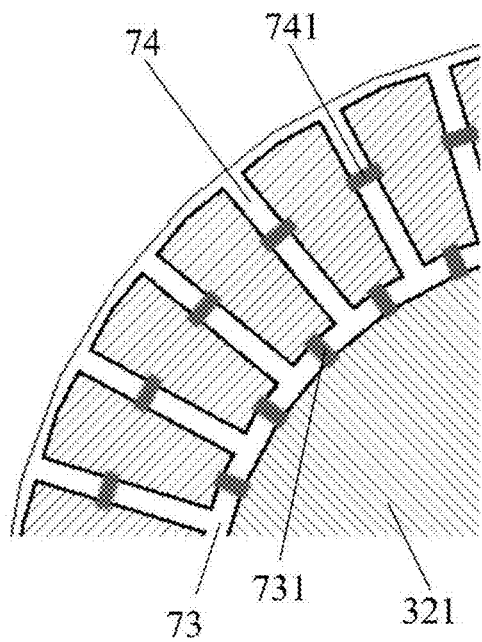
FIG. 7B shows a division of semitransparent area into sectors by radial slots.

An embodiment of FIG. 7B (a segment of the ground plane is shown in the figure) shows a division of semitransparent area 322 into sectors by radial slots 74 to reduce near field level in addition to the annular slot 73.

Figure 7C:
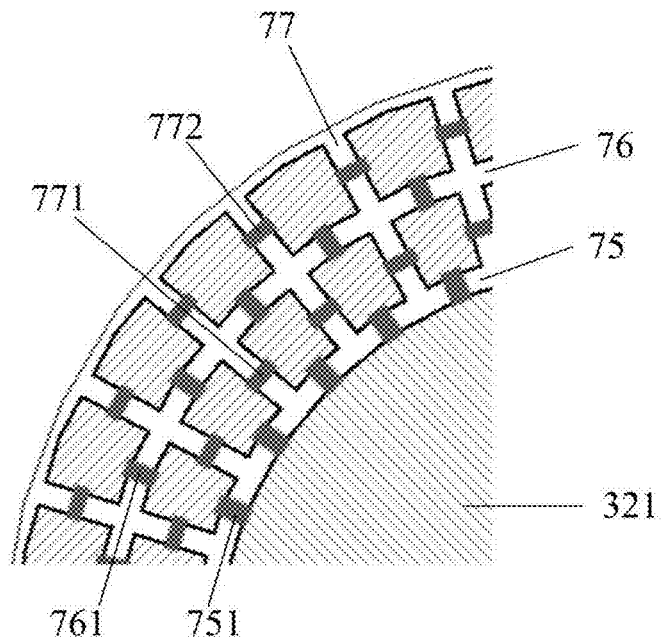
FIG. 7C shows semitransparent area containing two annular slots and being divided into sectors by radial slots.

An embodiment of FIG. 7C (there is a segment of the ground plane in the figure) shows semitransparent area 322 containing two annular slots 75 and 76 and being divided into sectors by radial slots 77.

Embodiments of FIGS. 7A-7C show slots containing elements 711, 721, 731, 741, 751, 761, 771, 772 correspondingly, with resistors and inductances which can be discrete or distributed.

Figure 8A:
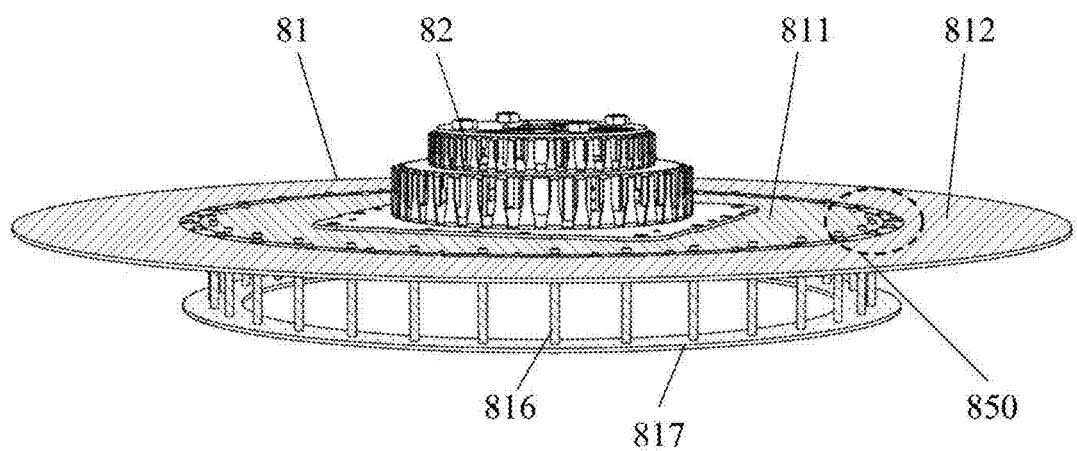
FIGS. 8A-8C show another embodiment of a design of an antenna system.
Figure 8B:
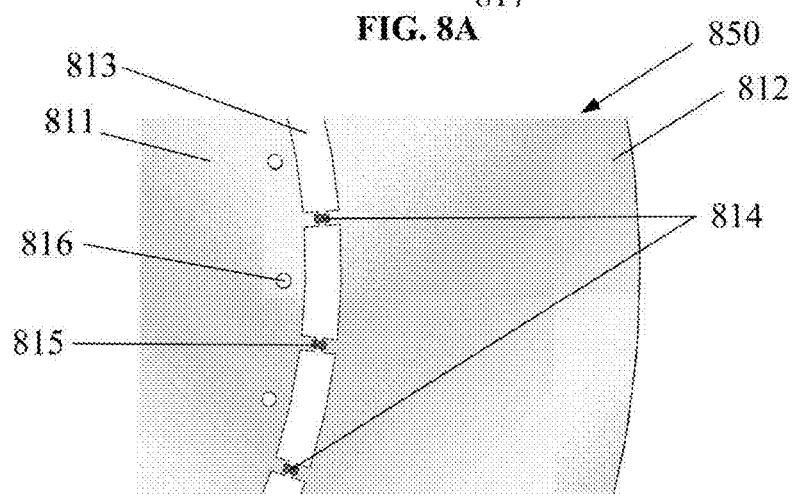
Figure 8C:
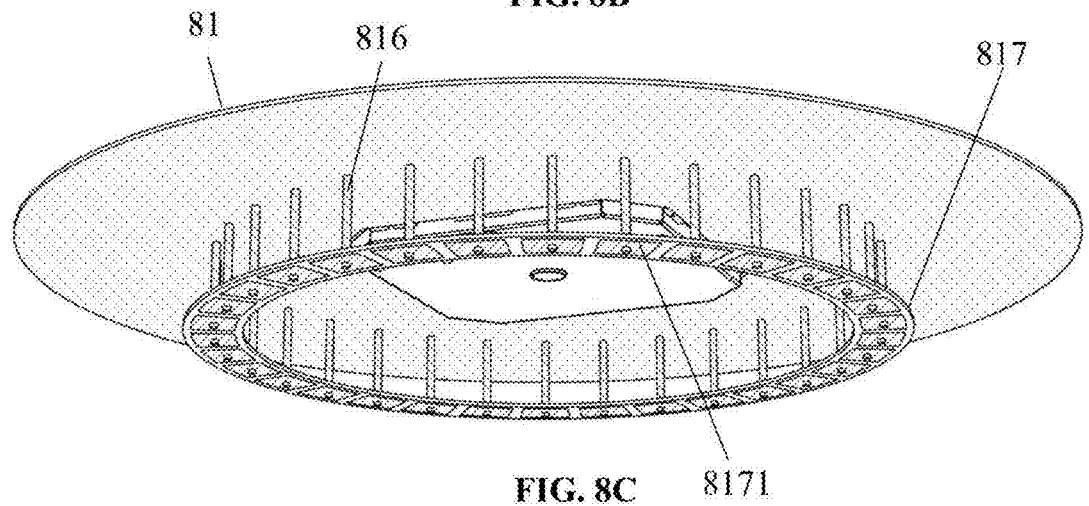

FIGS. 8A-8C present an embodiment of a design of an antenna system with reduced sensitivity to nearby objects. The following designations are used in the figure:
  81 is the ground plane;
  82 is the antenna element;
  811 is the nontransparent area of ground plane 81.
  812 is the metal part of the semitransparent area of ground plane 81;
  813 is the annular slot of the semitransparent area of ground plane 81;
  814 are the discrete resistors;
  815 is the discrete inductance;
  816 is the conducting pin;
  817 is the PCB the top layer of which is free of metallization, and the bottom layer contains expanded tips 8171 of conducting pins 816 produced by the printed circuit technique;
  850 is an area of the PCB that is shown in magnified form in FIG. 8B.

Ground plane 81 is a PCB whose bottom layer is free of metallization, and whose top metallized layer contains a slot 813 produced based on printed circuit technology. In the slot there are SMD-assembled discrete resistors 814 and inductances 815. One of the ends of the conducting pins passes through the hole in the PCB and is soldered out to its top metallized layer. The other end of the conducting pins passes through the corresponding PCB 817 and is soldered out to expanded tip 8171.

Below are the design parameters for an exemplary design implementation:
  Diameter of Ground plane 81: 270 mm;
  Diameter of Nontransparent area 811: 180 mm;
  Width of Semitransparent area 812: 40 mm;
  Ring slot diameter 813: 190 mm, slot width: 5 mm;
  Nominal values of resistors: 300 Ohm, and inductances: 6.8 nH;
  Length of Conducting pins: 20 mm, Diameter: about 1 mm;
  Expanded tips 8171 assembled onto PCB 817 are squares of 10 mm on the side.

A range of design parameters feasible for GNSS frequency band:
  Diameter of Ground plane 81: 250 . . . 350 mm;
  Diameter of Nontransparent area 811: 150 . . . 300 mm;
  Width of Semitransparent area 812: 25 . . . 50 mm;
  Ring slot width: 2 . . . 10 mm;
  Nominal values of resistors: 100 . . . 1000 Ohm, and inductances: 2 . . . 15 nH;
  Length of Conducting pins: 5 . . . 30 mm, diameter: 1 . . . 5 mm;
  Size of Expanded tips 5 . . . 20 mm.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A GNSS (global navigation satellite system) antenna system comprising:
  an electromagnetic radiator configured for reception of Right Hand Circularly Polarized GNSS signals, and assembled on an upper side of a ground plane,
  wherein the ground plane includes a nontransparent area in a center of the ground plane and a partially transparent area surrounding the nontransparent area, and wherein the partially transparent area reflects 10% to 90% of the GNSS signals at frequency ranges 1165-1300 MHz and 1530-1610 MHz,
  wherein either the nontransparent area or the partially transparent area is circular; and
  a plurality of vertical conducting elements near a boundary between the nontransparent area and the partially transparent area in the nontransparent area on a bottom side of the ground plane and extending downwards from the ground plane, the vertical conducting elements arranged in a circle of a diameter of at least 155 mm, around a center of the electromagnetic radiator and connected to the ground plane at the nontransparent area.

2. The antenna system of claim 1, wherein the nontransparent area is a conductive metal surface.

3. The antenna system of claim 1, wherein the nontransparent area is an impedance surface with imaginary surface impedance of an open circuit.

4. The antenna system of claim 1, wherein the partially transparent area is a metal surface with a set of slots with discrete or distributed elements.

5. The antenna system of claim 4, further comprising only one annular slot on a boundary between the nontransparent area and the partially transparent area.

6. The antenna system of claim 1, wherein the vertical conducting elements are parasitic conducting pins.

7. The antenna system of claim 6, wherein the conducting pins are cylindrically-shaped.

8. The antenna system of claim 6, wherein the conducting pins are mushroom-shaped.

9. The antenna system of claim 1, wherein the conducting pins are bolts inserted into corresponding holes in a ground plane from a top side, and further comprising a nut at an end of each bolt, the nut being galvanically connected to an expanded tip of each pin.

10. The antenna system of claim 1, further comprising a plurality of resistive elements connecting the nontransparent area and the partially transparent area.

11. The antenna system of claim 10, wherein the resistive elements are discrete.

12. The antenna system of claim 10, wherein the resistive elements are distributed.

13. The antenna system of claim 1, further comprising a plurality of inductive elements connecting the nontransparent area and the partially transparent area.

14. The antenna system of claim 13, wherein the inductive elements are discrete.

15. The antenna system of claim 13, wherein the inductive elements are distributed.

16. The antenna system of claim 1, wherein the partially transparent area is divided into multiple sections arranged circumferentially and having gaps between the sections.

17. The antenna system of claim 16, further comprising inductive or resistive elements connecting the sections.

18. The antenna system of claim 16, further comprising inductive or resistive elements connecting at least some of the sections.

19. The antenna system of claim 1, wherein the partially transparent area is divided into a first set of multiple sections arranged circumferentially and having gaps between the sections, and a second set of multiple sections arranged circumferentially and having gaps between the sections and surrounding the first set.

* * * * *